United States Patent [19]

Ito et al.

[11] Patent Number: 5,061,749
[45] Date of Patent: Oct. 29, 1991

[54] ONE-PACK TYPE HEAT PRECURABLE MOISTURE-CURING SEALANT COMPOSITION

[75] Inventors: Masahiro Ito, Mishima; Yukio Hayashi, Kyoto, both of Japan

[73] Assignee: Sunstar Giken Kabushiki Kaisha, Osaka, Japan

[21] Appl. No.: 557,779

[22] Filed: Jul. 26, 1990

[30] Foreign Application Priority Data

Jul. 28, 1989 [JP] Japan .................................. 1-197499

[51] Int. Cl.$^5$ .............................................. C08K 9/06
[52] U.S. Cl. .................... 524/850; 524/851; 524/853; 524/854; 525/123; 525/127
[58] Field of Search ............... 524/850, 837, 853, 854; 525/123, 127

[56] References Cited

U.S. PATENT DOCUMENTS

| | | | |
|---|---|---|---|
| 3,418,293 | 12/1968 | Bolchert | 526/279 |
| 4,029,626 | 6/1977 | Gillemot et al. | 524/874 |
| 4,066,599 | 1/1978 | Zimmerman | 524/875 |
| 4,640,950 | 2/1987 | Nishino et al. | 524/873 |
| 4,647,623 | 3/1987 | Kase et al. | 525/123 |
| 4,902,767 | 2/1990 | Roitman et al. | 528/30 |

FOREIGN PATENT DOCUMENTS 63-275673 11/1988 Japan .................................. 526/279

*Primary Examiner*—Paul R. Michl
*Assistant Examiner*—Karen A. H. Hellender
*Attorney, Agent, or Firm*—Wegner, Cantor, Mueller & Player

[57] ABSTRACT

One-pack type heat pre-curable moisture-curing sealant composition which comprises as the main component (A) a urethane prepolymer having a content of an active free isocyanate group (NCO) of 0.5 to 13% by weight which is prepared by reacting a polyol and an excess amount of an aromatic polyisocyanate compound, and (B) a vinyl polymer containing a siloxy group, and as an additive (C) a filler in an amount of 20 to 50% by weight based on the whole weight of the sealant, and (D) a plasticizer in an amount of 5 to 30% by weight based on the whole weight of the sealant, which can be precured at a comparatively lower temperature within a short period of time and cured with moisture in air and is useful for adhering various parts in automobile and construction industries without a temporary holding means.

6 Claims, No Drawings

ONE-PACK TYPE HEAT PRECURABLE MOISTURE-CURING SEALANT COMPOSITION

This invention relates to a one-pack type heat precurable moisture-curing sealant composition, more particularly to a one-pack type heat precurable moisture-curing sealant composition comprising a urethane prepolymer containing a specific amount of an active free isocyanate group and a vinyl polymer containing a hydrolyzable siloxy group, which can be precured at a comparatively lower temperature within a short period of time and has improved physical properties suitable for sealing by incorporating a specific amount of a filler and a plasticizer. The term "sealant" in this invention includes also "an adhesive".

PRIOR ART

There has recently been rapid progress in technology for adhering window glass and some parts around window in the production line of automobiles, and with the progress of such a technology, the substrates to be adhered with glass are partly changed from coated steel panels to plastic substrates, and thereby it has been required to develop a moisture-curing adhesive or sealant which can be precured within a short period of time by heating at a lower temperature to temporarily hold the substrates to be adhered without employing any specific temporary holding means until the subsequent curing with moisture.

Under the circumstance, the sealant (or the adhesive) has been required to be precurable at room temperature or a comparatively lower temperature, particularly to be rapidly reacted and precured at least partly within a short period of time and thereby to show also temporary holding effect. For such a demand, there have been proposed two-pack type sealants comprising a polyol and a urethane prepolymer and one-pack type moisture-curing sealants utilizing various amine or metallic catalysts. However, the former two-pack type sealants have less workability which causes decreases in demand therefor, and the latter one-pack type moisture-curing sealants are not sufficient in the curing speed. It has also been proposed to block the active free NCO group of a urethane prepolymer to prepare a one-pack type thermosetting sealant, but the blocking agent used therefor has a high dissociation temperature and hence the sealant can not be cured at a low temperature.

BRIEF DESCRIPTION OF THE INVENTION

The present inventors have intensively studied to find an improved one-pack type heat precurable moisture-curing sealant having satisfactory properties and have found that when a combination of a specific urethane prepolymer and a vinyl polymer containing a hydrolyzable siloxy group is used as the main component, the siloxy group of the vinyl polymer is hydrolyzed with moisture in air to produce a hydroxy group and the hydroxy group is reacted with the active free isocyanate group of the urethane prepolymer by which the reaction is promoted by heating at a comparatively lower temperature such as 40° to 120° C. without a problem of foaming which is observed in the conventional one-pack type moisture-curing sealants, and further that by adding a specific amount of a filler and a plasticizer to the main component, the sealant has excellent physical properties necessary for a sealant.

An object of the invention is to provide an improved one-pack type heat precurable moisture-curing sealant which is precurable at a comparatively lower temperature within a short period of time and has excellent physical properties. Another object of the invention is to provide a one-pack type heat precurable moisture-curing sealant comprising a urethane prepolymer containing an active free isocyanate group and a vinyl polymer containing a hydrolyzable siloxy group and further a specific amount of a filler and a plasticizer. These and other objects and advantages of the invention will be apparent to those skilled in the art from the following description.

DETAILED DESCRIPTION OF THE INVENTION

The invention provides a one-pack type heat precurable moisture-curing sealant composition which comprises as the main component (A) a urethane prepolymer having a content of an active free isocyanate group (NCO) of 0.5 to 13% by weight which is prepared by reacting a polyol and an excess amount of an aromatic polyisocyanate compound, and (B) a vinyl polymer containing in the molecule a siloxy group of the formula:

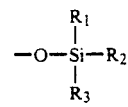

wherein $R_1$, $R_2$ and $R_3$ are the same or different and are each a lower ($C_1$-$C_4$) alkyl or phenyl, and as an additive (C) a filler in an amount of 20 to 50% by weight based on the whole weight of the sealant, and (D) a plasticizer in an amount of 5 to 30% by weight based on the whole weight of the sealant.

By the incorporation of the filler and plasticizer, the sealant is improved in the physical properties required in a sealant such as elongation, tensile strength and hardness.

The urethane prepolymer used in this invention is prepared by reacting a polyol and an excess amount of an aromatic polyisocyanate compound.

The polyol includes polyalkylene ether polyols, polyester polyols, polycarbonate diols, polylactone polyols, polytetramethylene glycols, and the like, which are difunctional or trifunctional. Particularly preferred polyols are polyalkylene ether triols having a molecular weight of 1,000 to 7,000, in view of the storage stability and non-foaming properties.

The aromatic polyisocyanate compound includes 2,4- or 2,6-tolylenediisocyanate, diphenylmethane-4,4'-diisocyanate, 1,5-naphthalenediisocyanate, xylylenediisocyanate, and the like.

The reaction of the polyol and the aromatic polyisocyanate compound is carried out under usual conditions, for example, at 50° to 90° C. for 0.5 to 5 hours, optionally in the presence of a reaction promoting catalyst such as dibutyl tin dilaurate, dibutyl tin maleate, stannous octoate, lead octoate, tertiary amine compounds, and the like, to give a urethane prepolymer having an NCO content of 0.5 to 13 %, preferably 1 to 4%. When the NCO content of the urethane prepolymer is less than 0.5%, the urethane prepolymer per se has less storage stability, which results in less storage stability of the final sealant. On the other hand, when the NCO content is more than 13%, the product shows significant foaming in the curing step, which tends to give a cured product having too great hardness and hence having no elongation as required.

The vinyl polymer containing the siloxy group of the formula as shown hereinbefore in the molecule is prepared, for example, by polymerizing a siloxy group-containinq vinyl monomer alone or together with a copolymerizable monomer in a solvent such as an aromatic solvent (e.g. toluene, xylene, etc.), an acetate solvent (e.g. ethyl acetate, butyl acetate, cellosolve acetate, etc.), or a ketone solvent (e.g. methyl ethyl ketone, methyl isobutyl ketone, etc.), in the presence of a radical polymerization initiator (e.g. azobisisobutyronitrile, di-t-butyl peroxide, benzoyl peroxide, etc.). The vinyl polymer containing a siloxy group has usually a number average molecular weight ($\overline{Mn}$) of 500 to 50,000. When the $\overline{Mn}$ is less than 500, the final sealant has insufficient physical properties, and on the other hand, when it is over 50,000, the vinyl polymer has less compatibility with the urethane prepolymer and further has less storage stability.

The siloxy group-containing vinyl monomer used in the above reaction includes, for example, trimethylsiloxyethyl acrylate or methacrylate (the acrylate or methacrylate being hereinafter referred to in the form of abbreviated expression as "(meth)acrylate"), trimethylsiloxypropyl (meth)acrylate, trimethylsiloxybutyl (meth)acrylate, triethylsiloxyethyl (meth)acrylate, tributylsiloxypropyl (meth)acrylate, triphenylsiloxyalkyl (meth)acrylate, and the like.

The copolymerizable monomer includes, for example, an ester of (meth)acrylic acid with an alkyl having 1 to 22 carbon atoms, styrene, vinyltoluene, t-butylstyrene, α-methylstyrene, glycidyl (meth)acrylate, 2-ethoxyethyl (meth)acrylate, (meth)acrylonitrile, cyclohexyl (meth)acrylate, unsaturated carboxylic acids (e.g. (meth)acrylic acid, malic acid, fumalic acid, itaconic acid, etc.), diesters of maleic acid or fumaric acid, (meth)acrylamide, N-alkoxymethylated (meth)acrylamides, N,N-dialkylaminoalkyl (meth)acrylates, phosphate group-containing (meth)acrylates, vinyl acetate, hexafluoropropylene, tetrafluoroethylene, and the like.

Some of the vinyl polymers containing a siloxy group are commercially available, for example, "Acrydic HZ" manufactured by Dainippon Ink K.K., Japan.

The one-pack type heat precurable moisture-curing sealant composition of this invention contains as the main component a combination of the above urethane prepolymer and a vinyl polymer having a siloxy group, and the siloxy group contained in the vinyl polymer is hydrolyzed with moisture in air to produce a hydroxy (OH) group which participates in the reaction with NCO of the urethane prepolymer. For this purpose, the urethane prepolymer and the vinyl polymer containing a siloxy group are incorporated in a molar ratio of NCO/OH of 0.3 to 3, preferably 0.5 to 2. In order to promote the above hydrolysis, there may be added an additive such as acidic catalysts (e.g. phosphoric acid, phosphate, phosphite, phosphate containing an unsaturated group, p-toluenesulfonic acid or an amine salt thereof, benzoic acid, trichloroacetic acid, trifluoroacetic acid, naphthalenedisulfonic acid or an amine salt thereof, etc.), amines (e.g. ethylenediamine, N-β-aminoethyl-γ-aminopropyltrimethoxysilane, butylamine, dibutylamine, t butylamine, hexylamine, triethylamine, etc.), alkyl titanates or octylates, carboxylic acid metal salts (e.g. dibutyl tin dilaurate, lead octylate, etc.), sulfides (e.g. monobutyl tin sulfide, dioctyl tin mercaptide, etc.), mercaptide type organic tin compounds, tetraethylammonium fluoride, cesium fluoride, and the like. The additive is usually added in an amount of 0.001 to 10 parts by weight, preferably 0.1 to 5 parts by weight, to 100 parts by weight of the vinyl polymer containing a siloxy group.

Besides, in order to improve the storage stability of the composition, it may also be incorporated with a conventional moisture adsorber, for example, trialkyl orthoformates (e.g. trimethyl orthoformate, triethyl orthoformate, tributyl orthoformate, etc.), trialkyl orthoacetates (e.g. trimethyl orthoacetate, triethyl orthoacetate, tributyl orthoacetate, etc.), trialkyl orthoborates (e.g. tributyl orthoborate, triethyl orthoborate, etc.), tetra-alkyl (or substituted alkyl) silicates (e.g. tetramethyl silicate, tetraethyl silicate, tetrabutyl silicate, tetra(2-methoxyethyl) silicate, tetra(2-chloroethyl) silicate, etc.), tetraphenyl silicate, tetrabenzyl silicate, di-, tri-, tetra- or hexa-mer of tetraethyl silicate, or hydrolyzable esters of these silicates, isocyanate group-containing compounds (e.g. phenylisocyanate, p-chlorophenylisocyanate, benzenesulfenylisocyanate, p-toluenesulfonylisocyanate, isocyanatoethyl methacrylate, etc.), and the like. The moisture absorber may be incorporated in an amount of 0.1 to 30 parts by weight to 100 parts by weight of the vinyl polymer containing a siloxy group. Particularly preferred moisture absorber is isocyanate group-containing compounds.

In the sealant composition comprising the above main component and optional other additives, it is necessary to further incorporate a specific amount of a filler and a plasticizer in order to give the composition the desired physical properties for a sealant, that is, an elongation of 100 to 800 %, a tensile strength of 20 to 60 kg/cm$^2$, and a hardness (Shore A) of 30 to 70.

The filler includes carbon black (e.g. Furnace Black, Thermal Black, etc.), silicic anhydride, calcium carbonate, calcium carbonate which is surface-treated with a fatty acid, clay, talc, and the like, which are previously dried to a water content of 0.05 % or less. Among them, carbon black is particularly preferable because it functions also as a reinforcement. The filler is incorporated in an amount of 20 to 50 % by weight, preferably 30 to 40 % by weight, based on the whole weight of the composition. When the amount of a filler is less than 20 % by weight, the sealant does not show the desired strength (tensile strength 20 to 60 kg/cm$^2$), and on the other hand, when the amount is over 60 % by weight, the sealant tends not to show the desired elongation (100 to 800 %).

The plasticizer is to have a water content of 0.05 % or lower and includes phthalates (e.g. di(2-ethylhexyl) phthalate, diundecyl phthalte, butyl benzyl phthalate, etc.), trimellitates (e.g. 2-ethylhexyl trimellitate, etc.), dicarboxylic acid esters (e.g. dioctyl adipate, dioctyl sebacate, dioctyl azelate, etc.), and the like. The plasticizer is incorporated in an amount of 5 to 30% by weight, preferably 10 to 25% by weight, based on the whole weight of the composition. When the amount of a plasticizer is less than 5% by weight, the sealant does not show the desired elongation (100 to 800%) and further hardness (Shore A 30 to 70), and on the other hand, when the amount is over 30% by weight, the sealant does not show the desired strength (tensile strength 20 to 60 kg/cm²) and further shows a disadvantageous bleeding phenomenon.

Taking into consideration the amount of the filler and plasticizer, the main components are used in an amount of 20 to 50% by weight based on the whole weight of the composition.

Thus, since the composition of this invention contains a vinyl polymer containing a hydrolyzable siloxy group and the hydroxy group is promptly produced therefrom by heating at a comparatively low temperature such as 40 to 120° C., preferably 60° to 100° C., the sealant can be precured very rapidly. Besides, since the active isocyanate group of the urethane prepolymer contained as the other main component in the present composition is cured by reacting with moisture in air, the sealant can be cured even at room temperature.

The composition of this invention may further be incorporated with other conventional additives, such as viscosity controlling solvents, thixotropic agents, ultraviolet absorbers, antioxidants, dyes and pigments, tackifiers (e.g. silane coupling agents), and the like.

This invention is illustrated by the following Examples and Reference Examples, but should not be construed to be limited thereto.

EXAMPLE 1

(1) Preparation of a urethane prepolymer

Polyoxypropylene-ethylene-triol having a molecular weight of 7,000 (3,000 g) is added to a reaction vessel which is purged with nitrogen gas, and is dried under vacuum (lower than 10 mmHg). After confirming that the compound has a water content of less than 0.05%, 2,4-/2,6-tolylenediisocyanate (258 g) is added thereto, and the mixture is reacted at a temperature of 80±5° C. under vacuum for 5 hours. After the reaction, the reaction mixture is cooled to give a urethane prepolymer having an NCO content of 2.2% and a viscosity of 15,000 cps/20° C.

(2) Preparation of a sealant composition

The urethane prepolymer obtained in the above (1) (600 g) is added to a vessel with a stirrer which is purged with nitrogen gas, and thereto is added $(CH_3)_3$—Si—O— containing vinyl polymer (Acrydic HZ-593, $\overline{Mn}$: 6,000, OH value: 31, manufactured by Dainippon Ink K.K.) (300 g). The mixture is stirred under nitrogen gas to dissolve both components well and thereto is added dehydrated di(2-ethylhexyl) phthalate (400 g). After stirring the mixture for 10 minutes, dried carbon black (600 g) and dried calcium carbonate (300 g) are gradually added to the mixture. After completion of the addition, the mixture is degassed by stirring under vacuum (lower than 10 mmHg) for 20 minutes, and thereto are added xylene (100 g, for controlling the viscosity) and lead octylate (3 g, for promoting the hydrolysis and also curing reaction of urethane), and the mixture is stirred under vacuum for 10 minutes. The sealant composition thus prepared is packaged in a sealed aluminum cartridge.

EXAMPLE 2

(1) Preparation of a urethane prepolymer

Polyoxypropylene-ethylene-triol having a molecular weight of 5,000 (3,000 g) is added to a reaction vessel which is purged with nitrogen gas, and is dried under vacuum (lower than 10 mmHg). After confirming that the compound has a water content of less than 0.05%, 4,4'-diphenylmethanediisocyanate (546.5 g) is added thereto, and the mixture is reacted at a temperature of 80±5° C. under vacuum for 4 hours. After the reaction, the reaction mixture is cooled to give a urethane prepolymer having an NCO content of 3.1% and a viscosity of 28,000 cps/20° C.

(2) Preparation of a sealant composition

The urethane prepolymer obtained in the above (1) (600 g) is added to a vessel with a stirrer which is purged with nitrogen gas, and thereto is added $(CH_3)_3$—Si—O— containing vinyl polymer (Acrydic HZ-594, $\overline{Mn}$: 10,000, OH value: 38, manufactured by Dainippon Ink K.K.) (300 g). The mixture is stirred under nitrogen gas to dissolve both components well and thereto is added dehydrated di(2-ethylhexyl) phthalate (400 g). After stirring the mixture for 10 minutes, dried carbon black (600 g) and dried calcium carbonate (300 g) are gradually added to the mixture. After completion of the addition, the mixture is degassed by stirring under vacuum (lower than 10 mmHg) for 20 minutes, and thereto are added xylene (100 g, for controlling the viscosity) and lead octylate (3 g, for promoting the hydrolysis and also curing reaction of urethane), and the mixture is stirred under vacuum for 10 minutes. The sealant composition thus prepared is packaged in a sealed aluminum cartridge.

Reference Example 1

The urethane prepolymer obtained in Example 1/(1) (600 g) is added to a vessel with a stirrer which is purged with nitrogen gas, and thereto is added dehydrated di(2-ethylhexyl) phthalate (300 g). The mixture is stirred under nitrogen gas to dissolve both components well, and dried carbon black (600 g) and dried calcium carbonate (300 g) are gradually added to the mixture. After completion of the addition, the mixture is degassed by stirring under vacuum (lower than 10 mmHg) for 20 minutes, and thereto are added xylene (100 g, for controlling the viscosity) and lead octylate (3 g, as a urethane curing catalyst), and the mixture is stirred under vacuum for 10 minutes. The sealant composition thus prepared is packaged in a sealed aluminum cartridge.

Reference Example 2

The urethane prepolymer obtained in Example 1/(1) (600 g) is added to a vessel with a stirrer which is purged with nitrogen gas, and thereto is added a vinyl polymer having no siloxy group, i.e. acrylic polyol (Acrydic Cu-1206, OH value: 30, manufactured by Dainippon Ink K.K.) (300 g). The mixture is stirred under nitrogen gas to dissolve well both components and thereto is added dehydrated di(2-ethylhexyl) phthalate (300 g). After stirring the mixture for 10 minutes, dried carbon black (600 g) and dried calcium carbonate (300 g) are gradually added to the mixture. After completion of the addition, the mixture is degassed by stirring under vacuum (lower than 10 mmHg) for 20 minutes, and thereto are added xylene (70 g, for controlling the viscosity) and lead octylate (3 g, as a urethane curing catalyst), and the mixture is stirred under vacuum for 10 minutes. The sealant composition thus prepared is packaged in a sealed aluminum cartridge.

Reference Example 3

The urethane prepolymer obtained in Example 1/(1) (400 g) is added to a vessel with a stirrer which is purged with nitrogen gas, and thereto is added (CH₃)₃—Si—O— containing vinyl polymer (Acrydic HZ-593, Mn: 6,000, OH value: 31, manufactured by Dainippon Ink K.K.) (200 g). The mixture is stirred under nitrogen gas to dissolve well both components and thereto is added dehydrated di(2-ethylhexyl) phthalate (600 g, 31.5%). After stirring the mixture for 10 minutes, dried carbon black (300 g) and dried calcium carbonate (300 g) are gradually added to the mixture. After completion of the addition, the mixture is degassed by stirring under vacuum (lower than 10 mmHg) for 20 minutes, and thereto are added xylene (100 g, for controlling the viscosity) and lead octylate (3 g), and the mixture is stirred under vacuum for 10 minutes. The sealant composition thus prepared is packaged in a sealed aluminum cartridge.

Experiment

The sealant compositions prepared in Examples 1 and 2 and Reference Examples 1 and 3 were subjected to the following tests for studying the properties. The results are shown in Table 1. Since the sealant composition prepared in Reference Example 2 showed a large increase of viscosity when kept at 20° C. for 24 hours and became a gel-like product, it could not be subjected to the tests.

(1) Curability with heat (adhesion)

As the substrates to be adhered (width 25 mm), there were employed a glass plate treated with a primer (Primer 435-40, manufactured by Sunstar Giken K.K.) and a coated steel panel which was treated with a primer (Primer 435-95, manufactured by the same company as above). The sealant composition to be tested was applied to these substrates in a length of 10 mm, width of 25 mm and thickness of 5 mm, and the substrates were laminated with each other and then precured by heating at a temperature of 60°, 80° or 100° C. for 30 or 60 minutes. Thereafter, the laminated substrates were subjected to a test of adhesion strength (kg/cm²) at a tensile rate of 200 mm/minute. (In the result, "CF" means cohesive failure of the sealant)

(2) Rubbery properties

The sealant composition to be tested was applied to a release paper, and was precured by heating at 60° C. for 30 minutes and then kept at room temperature for 48 hours for moisture-curing with moisture in air to give a test sheet of the sealant composition (thickness 2 mm). The test sheet was punched out to prepare a 2# Dumbbell specimen (thickness 2 mm). As to the Dumbbell specimen, the elongation (%), strength at break (kg/cm²) and hardness (Shore A) were measured by the method as described in JIS K-6301.

(3) Storage stability

The sealant composition to be tested was kept in a sealed vessel at a temperature of 20° or 40° C. for 10, 20 or 30 days, and thereafter, the state of the composition was observed. (In the result, "o" means no increase of viscosity, that is, the storage stability was excellent).

TABLE 1

|  |  | Example No. 1 | Example No. 2 | Reference Example No. 1 | Reference Example No. 3 |
|---|---|---|---|---|---|
| (1) Curability with heat (adhesion) | 60° C. × 30 min. | 18.5 CF | 20.3 CF | 2.4 (Not curred at the central region) | 7.8 CF |
|  | 60° C. × 60 min. | 29.8 CF | 27.4 CF | 3.8 (Not curred at the central region) | 10.8 CF |
|  | 80° C. × 30 min. | 31.8 CF | 32.4 CF | 5.4 (Not curred at the central region, foaming in curred region) | 13.7 CF |
|  | 100° C. × 30 min. | 38.6 CF | 35.4 CF | 5.8 (Not curred at the central region, foaming in curred region) | 18.1 CF |
| (2) Rubbery properties | Elongation (%) | 600 | 450 | 550 | 780 |
|  | Strength at break (kg/cm²) | 48 | 48 | 55 | 18 |
|  | Hardness (JIS A) | 47 | 49 | 51 | 29 |
| (3) Storage stability | 20° C. × 10 days |  |  |  |  |
|  | 20° C. × 30 days |  |  |  |  |
|  | 40° C. × 10 days |  |  |  |  |
|  | 40° C. × 20 days |  |  |  |  |

What is claimed is:

1. A one-pack type heat precurable moisture-curing sealant composition which comprises as the main component
    (A) a urethane prepolymer having a content of an active free isocyanate group (NCO) of 0.5 to 13 % by weight which is prepared by reacting a polyol and an excess amount of an aromatic polyisocyanate compound, and
    (B) a vinyl polymer having a number average molecular weight of 500 to 50,000 containing a siloxy group of the formula:

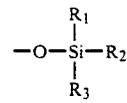

wherein R₁, R₂ and R₃ are the same or different and are each a C₁-C₄ alkyl or phenyl in the molecule, and as an additive
    (C) a filler in an amount of 20 to 50 % by weight based on the whole weight of the sealant, and
    (D) a plasticizer in an amount of 5 to 30 % by weight based on the whole weight of the sealant.

2. The composition according to claim 1, wherein the urethane prepolymer (A) has an NCO content of 1 to 4 %.

3. The composition according to claim 1, wherein the urethane prepolymer (A) and the vinyl polymer containing a siloxy group (B) are incorporated in a molar ratio of NCO/OH of 0.3 to 3.

4. The composition according to claim 1, wherein the filler (C) is incorporated in an amount of 30 to 40% by weight based on the whole weight of the composition, and the plasticizer (D) is incorporated in an amount of 10 to 25% by weight based on the whole weight of the composition.

5. The composition according to claim 1, wherein the main components of the urethane prepolymer (A) and the vinyl polymer containing a siloxy group (B) are incorporated in an amount of 20 to 50% by weight based on the whole weight of the composition.

6. The composition according to claim 1, wherein the filler is carbon black.

* * * * *